343-872 CROSS REFERENCE SEARCH ROOM

Aug. 4, 1970 W. S. HALSTEAD 3,523,251
ANTENNA STRUCTURE WITH AN INTEGRATED AMPLIFIER
RESPONSIVE TO SIGNALS OF VARIED POLARIZATION
Filed Feb. 27, 1967 8 Sheets-Sheet 1

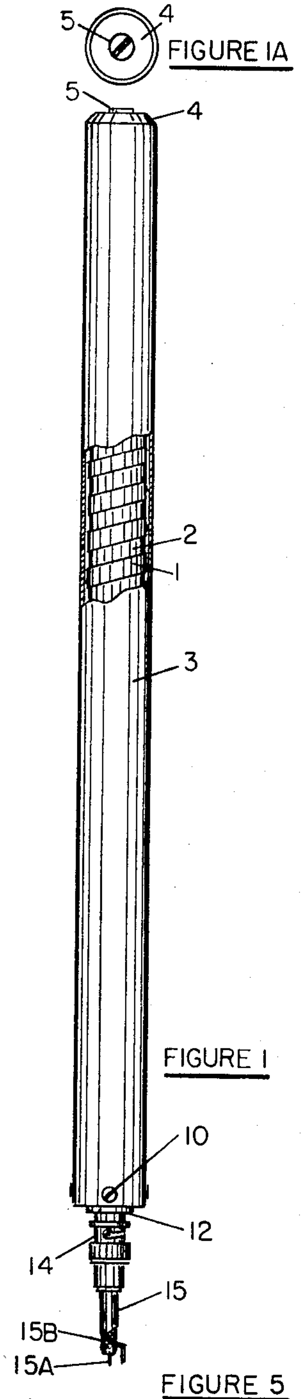
FIGURE 1A, FIGURE 1

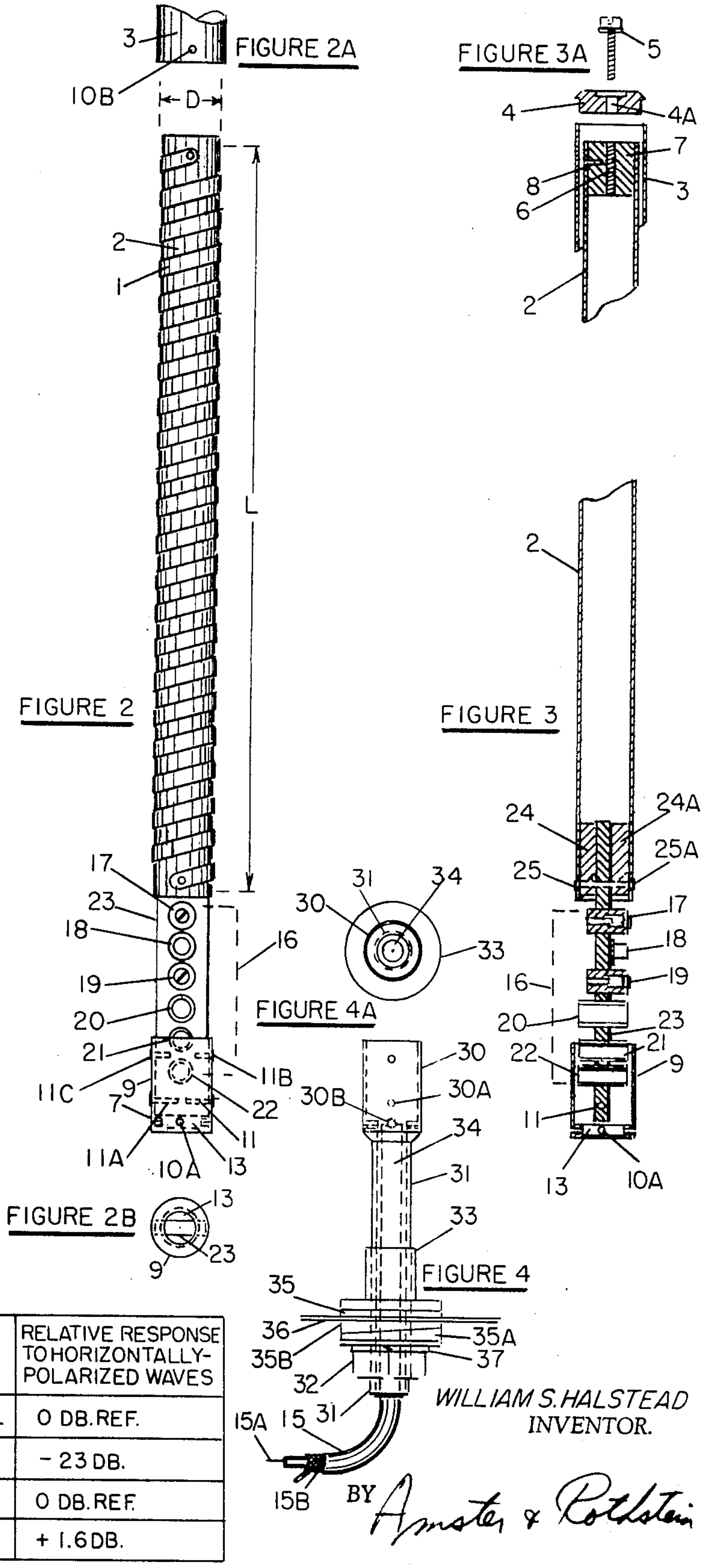
FIGURE 2A, FIGURE 2, FIGURE 2B, FIGURE 3A, FIGURE 3, FIGURE 4A, FIGURE 4

FIGURE 5

| TYPE OF ANTENNA (F=98.5mc) | POSITION OF ANTENNA | RELATIVE RESPONSE TO HORIZONTALLY-POLARIZED WAVES |
|---|---|---|
| STANDARD DI-POLE (1/2 λ) | HORIZONTAL | 0 DB.REF. |
| | VERTICAL | − 23 DB. |
| HELICAL L=APPROX. 1/8λ L/D = 14:1 | HORIZONTAL | 0 DB.REF. |
| | VERTICAL | + 1.6 DB. |

WILLIAM S. HALSTEAD
INVENTOR.

BY Amster & Rothstein

WILLIAM S. HALSTEAD
INVENTOR.

BY Amster & Rothstein

ANTENNA STRUCTURE WITH AN INTEGRATED AMPLIFIER RESPONSIVE TO SIGNALS OF VARIED POLARIZATION

Filed Feb. 27, 1967

WILLIAM S. HALSTEAD
INVENTOR.

BY Anster & Rothstein

WILLIAM S. HALSTEAD
INVENTOR.

BY Anster & Rothstein

WILLIAM S. HALSTEAD
INVENTOR.
BY Amster & Rothstein

WILLIAM S. HALSTEAD
INVENTOR.

BY Amster & Rothstein

WILLIAM S. HALSTEAD
INVENTOR.

BY Amster & Rothstein

WILLIAM S. HALSTEAD
INVENTOR.

BY Amster & Rothstein

3,523,251
ANTENNA STRUCTURE WITH AN INTEGRATED AMPLIFIER RESPONSIVE TO SIGNALS OF VARIED POLARIZATION

William S. Halstead, 10 W. 16th St., New York, N.Y. 10011

Filed Feb. 27, 1967, Ser. No. 618,877
Int. Cl. H04b 1/18
U.S. Cl. 325—373 18 Claims

ABSTRACT OF THE DISCLOSURE

An antenna structure including an amplifier built into the antenna casing. The basic antenna configuration is an open-ended helically wound metallic ribbon, with the helical turns uniformly spaced from each other. The length of the helix is large as compared to the diameter and may be shorter than one-quarter wavelength of the received electromagnetic energy, with the ratio of length to diameter of the helix being a factor in attaining spherical response of the antenna to transmitted energy. The intimate linking of the amplifier and the antenna substantially eliminates the transmission losses and often out-of-phase signal that often occur between an antenna and a receiver. The antenna is adapted to be mounted at any angular orientation and provides sensitive pickup of differently polarized electromagnetic energy from a variety of such orientations.

This invention relates primarily to receiving antennas and more particularly to an integrated antenna-preamplifier structure of relatively small dimensions that provides spherical response to electromagnetic energy of any polarization mode and is suitable for use on the interior of aircraft, on the interior or exterior surface vehicles, within buildings and in association with directional antenna configurations at outdoor locations.

In adapting FM multiplex receiving systems for use in providing information service to passengers in various transportation vehicles by means of a super-audible subcarrier impressed on the main carrier of FM broadcast stations, it has been determined that conventional antennas, such as dipoles or similar structures, are deficient because of their well-known directional and polarization characteristics. The characteristics make such antennas unsuitable in mobile applications, particularly when horizontally polarized waves are radiated by the broadcast station, as is common practice in the radio industry.

It also has been found that a serious problem is presented in providing communication services to mobile vehicles via the FM multiplex method because of the susceptibility of conventional antenna systems, particularly under multipath conditions that are prevalent in moving vehicles, to the introduction of out-of-phase relationships between main-channel and subchannel signals which cause audible crosstalk, noise and distortion in subchannel receivers. Moreover, prior art antennas are too large and cumbersome to permit their being adapted to mobile communications services where space is at a premium. It is therefore an object of the present invention to provide an antenna structure of relatively small dimensions and having high-gain capability, suitable for use on the interior of vehicles and buildings, which has spherical response to electromagnetic energy of any polarization when mounted in any position.

It is another object of this invention to provide an antenna structure which may readily be mounted in any position within a vehicle and which will have substantially uniform omnidirectional characteristics regardless of the polarization characteristic of transmitted radio-wave energy.

It also is an object of this invention to incorporate as an inherent part of the antenna structure a preamplifier to increase received signal strength and to provide optimum impedance match between the antenna and a receiver to minimize the amount of reflected wave energy or out-of-phase signals on any transmission line used between the antenna preamplifier structure and the receiver.

It is an additional object of this invention to provide an integrated antenna and preamplifier structure that is adaptable for use in association with unidirectional antenna configurations or arrays installed at outdoor locations.

It is a further object of the invention to provide a fully-enclosed antenna structure suitable for use on the exterior of vehicles to eliminate noise caused by static discharge from snow or ice particles when they come in contact with unprotected conducting elements of antennas under some atmospheric conditions in the presence of weak signals.

It is still another object of the invention to provide an integrated antenna and preamplifier structure of small dimensions having omnidirectional response with high gain in all polarization modes and designed to respond to all polarization modes of transmitted signals.

An antenna constructed in accordance with the principles of the present invention comprises a compact helical antenna configuration that presents substantially uniform response to transmitted electromagnetic energy of any polarization mode when mounted in any position, thereby providing an omnidirectional characteristic. Incorporation of a preamplifier illustratively of the transistor type, as an inherent part of the antenna structure eliminates any transmission line between the antenna and the first radio frequency amplifier. (This is where out-of-phase signals, causing crosstalk, commonly occur due to impedance mismatch or the impression of out-of-phase signals on the transmission line in the presence of a high-intensity electromagnetic field when within a distance of several miles from powerful broadcast stations.) The amplification provided can be of the order of 15 db or more, resulting in a signal at the input of the receiver that is approximately of the same level as normally can be obtained from a multi-element directional antenna (e.g., a unidirectional half-wave dipole wtih a reflector and plural director elements) and is sufficient to produce excellent reception of FM multiplex signals without crosstalk when an antenna designed in accordance with the invention is employed in aircraft at distances in excess of 100 miles from transmitting stations.

It is therefore a feature of an embodiment of this invention that an antenna is of helical configuration with an axial length, along the helix, of less than one-quarter wavelength.

It is another feature of an embodiment of this invention that a compact amplifier is included within the case of an antenna to eliminate any impedance mismatch between the antenna and a first radio frequency amplifier and to reduce transmission losses that often occur between an antenna and radio frequency amplifier circuitry.

The above brief description, as well as further objects, features and advantages of the present invention, will be more fully appreciated by reference to the following detailed description of a present preferred, but nonetheless illustrative embodiment demonstrating objects and features of the invention, when taken in conjunction with the accompanying drawing, wherein:

FIG. 1 is a side elevation of a helical antenna structure in accordance with the present invention, partly broken away to show the helical configuration;

FIG. 1A is a top view of the structure shown in FIG. 1;

FIG. 2 is a side view of the antenna structure shown in

Figure 6:
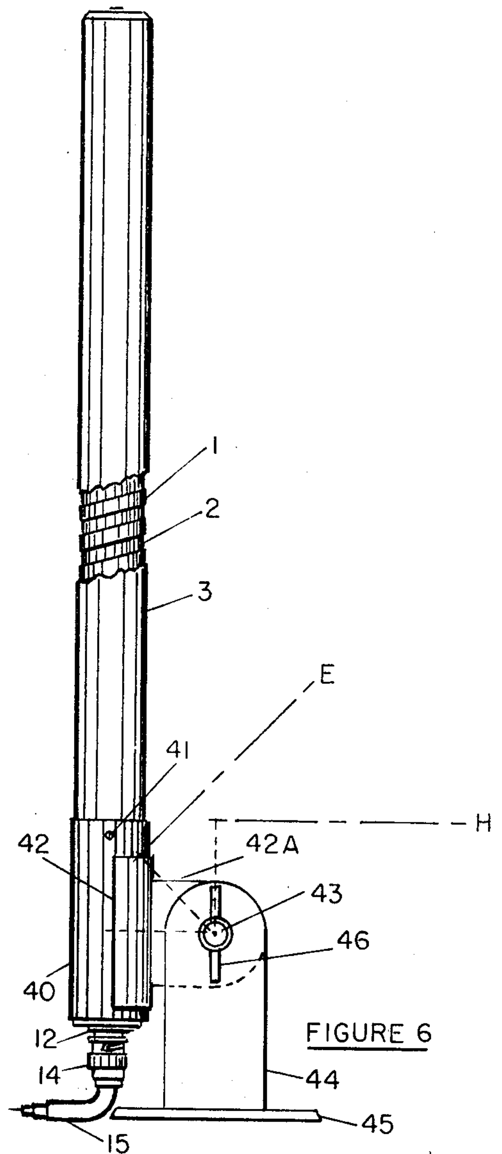
Figure 7:
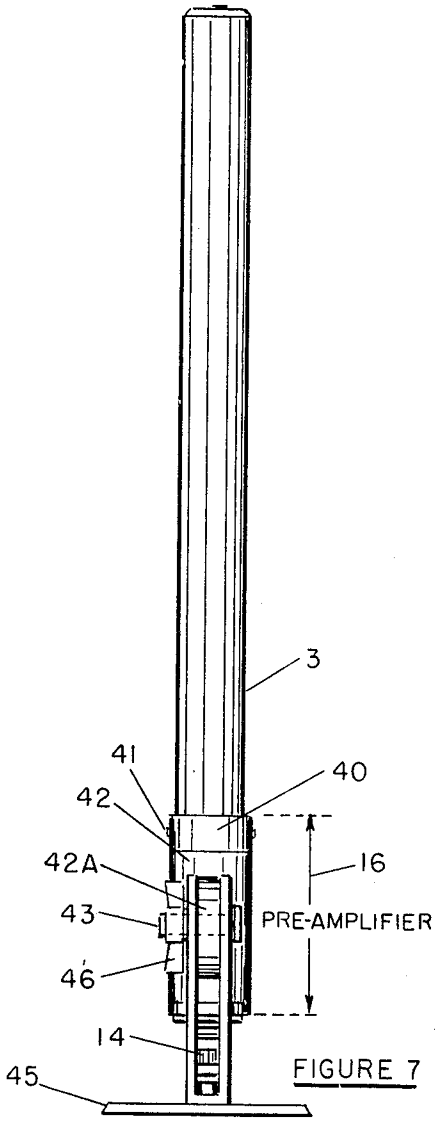
Figure 8:
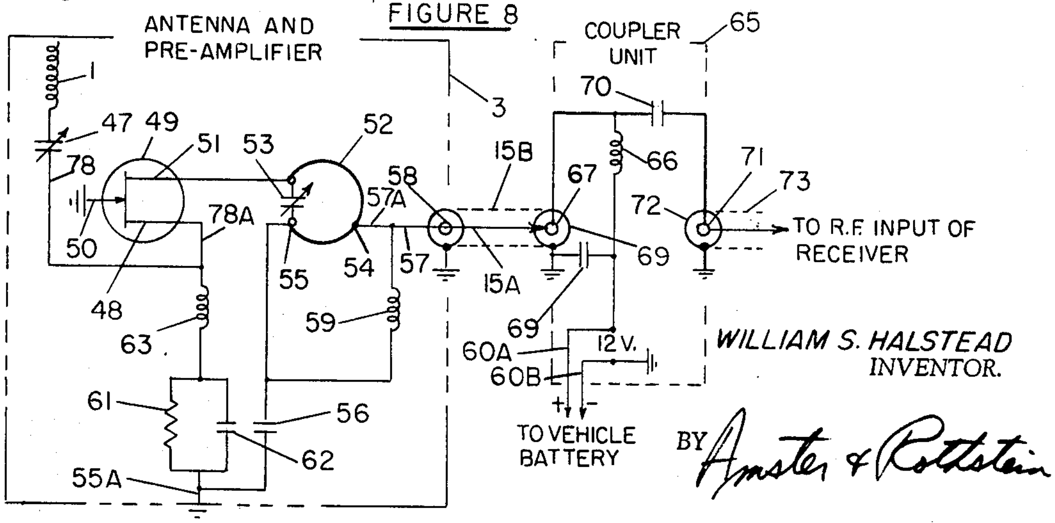
Figures 9, 9A, 9B, 10, 10A, 11, 11A, 11B:
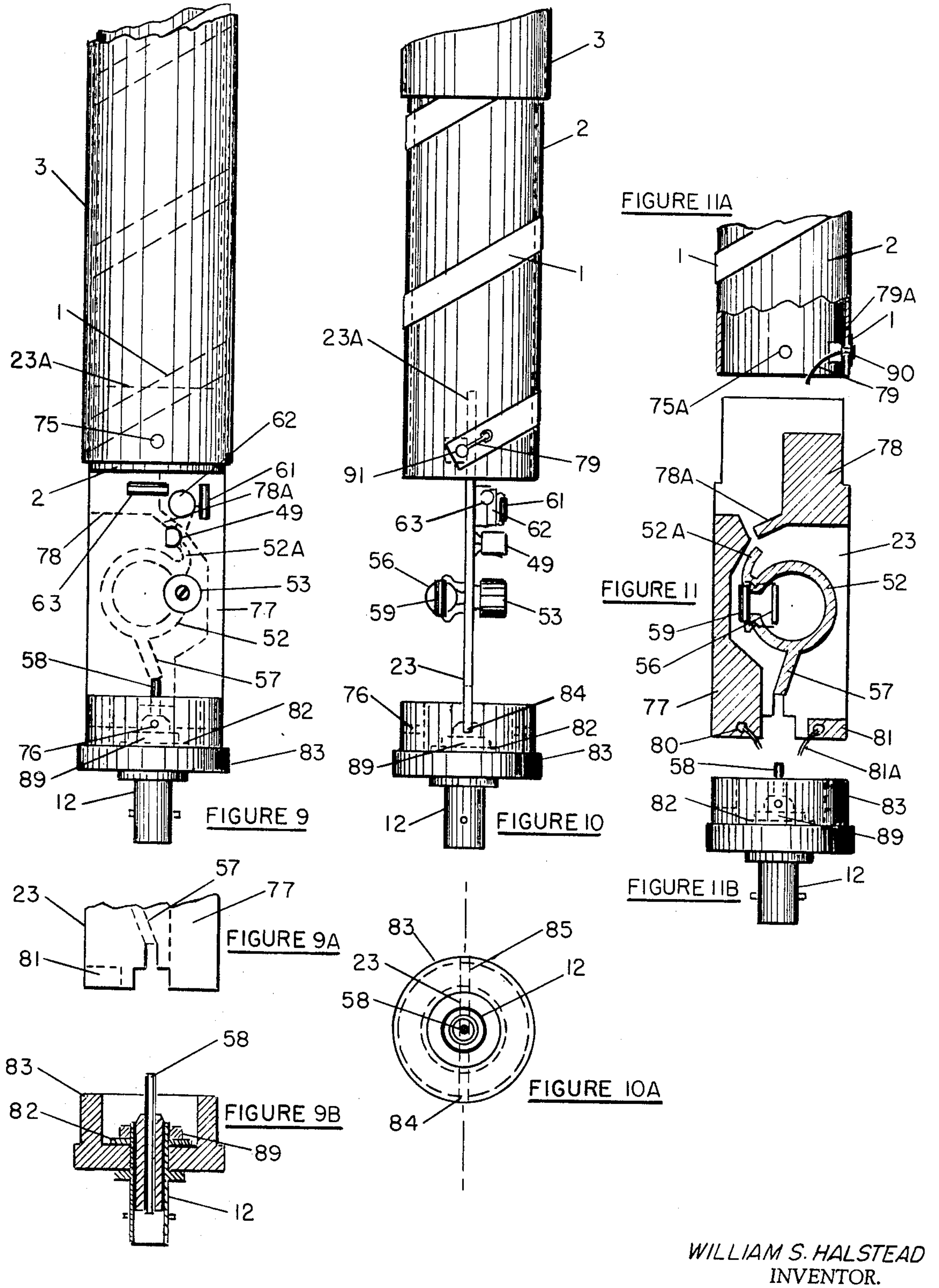
Figure 14:
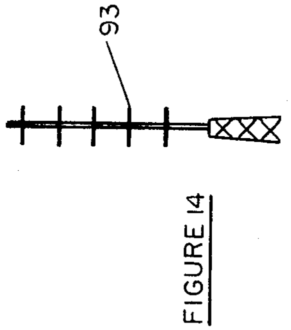
Figures 12, 13:
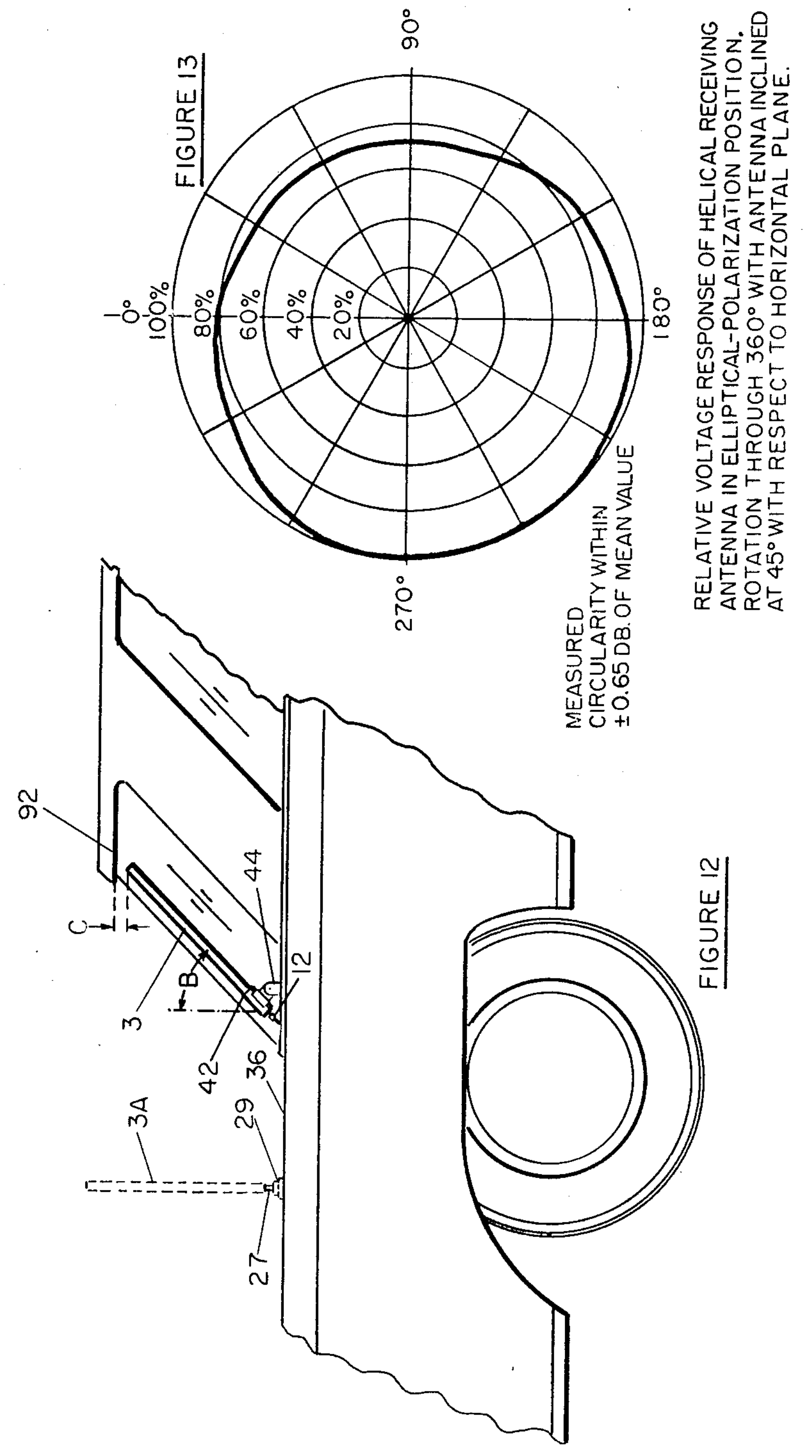
Figures 15, 15A, 16, 17:
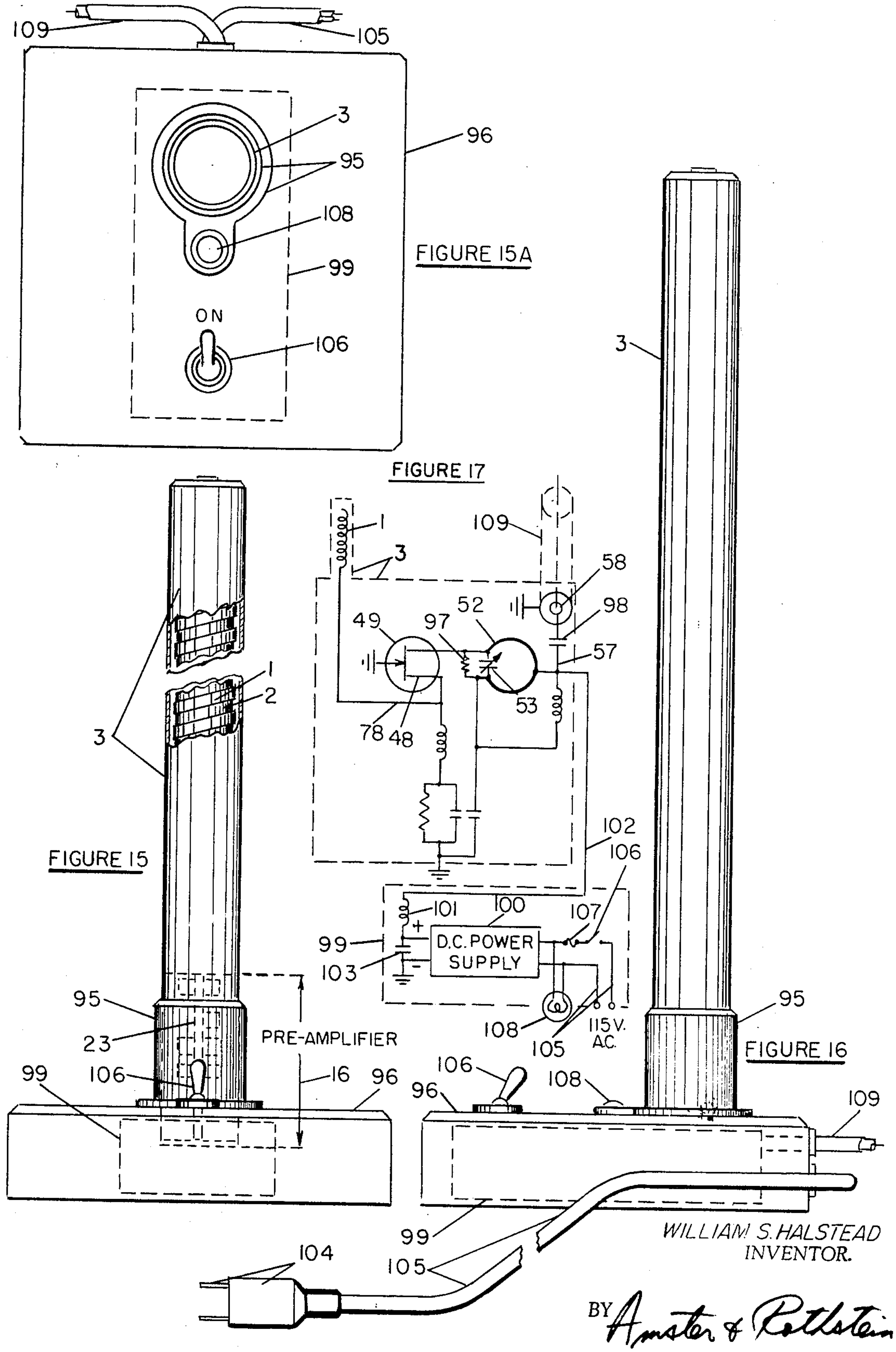
Figure 18A:
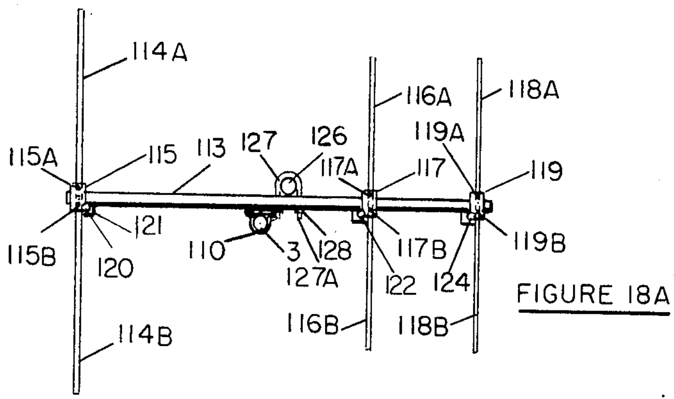
Figure 18:
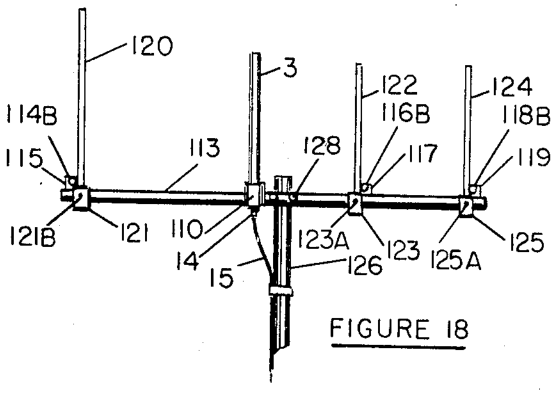
Figure 18B:
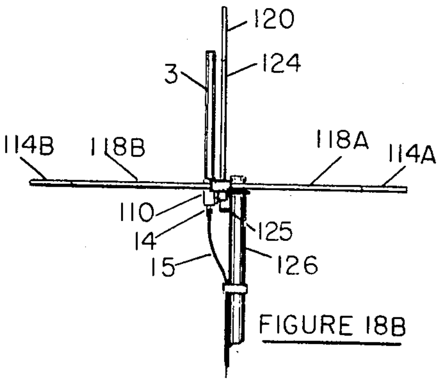
Figures 19, 19A:
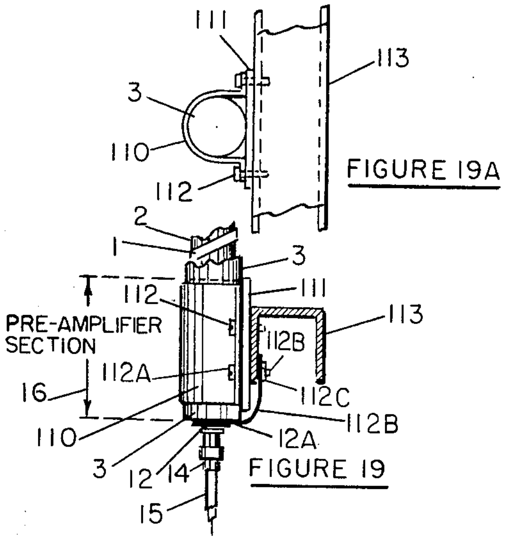
Figure 20:
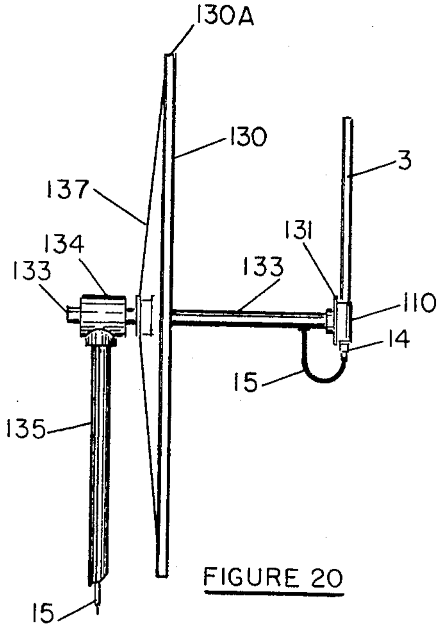
Figure 20A:
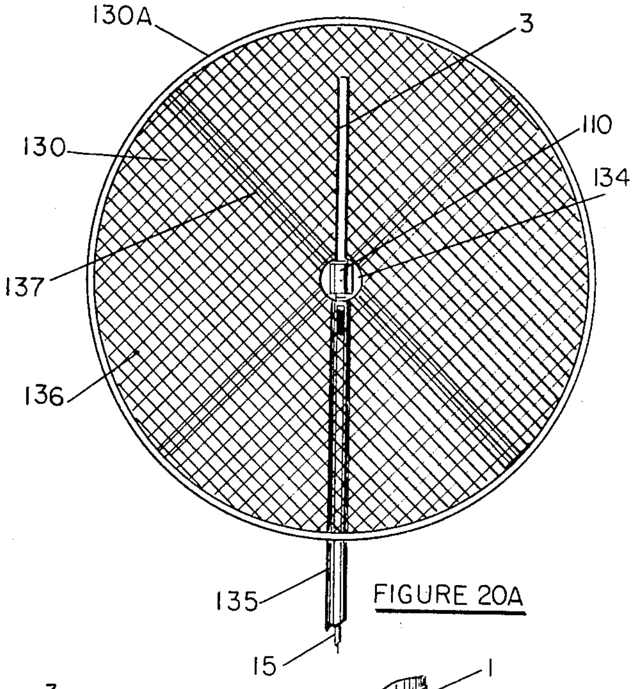
Figure 21:
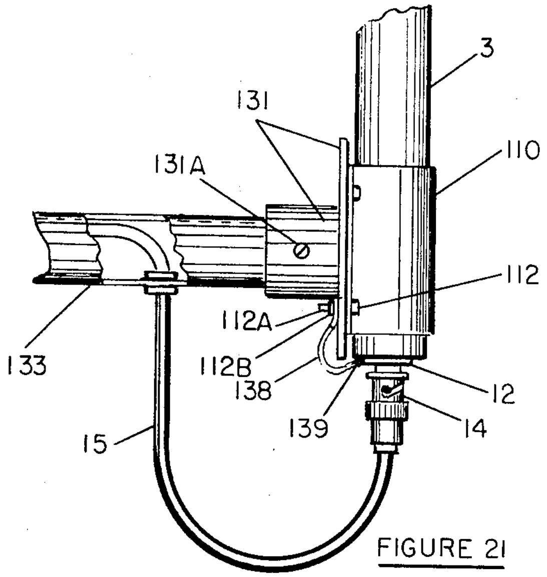
Figure 21A:
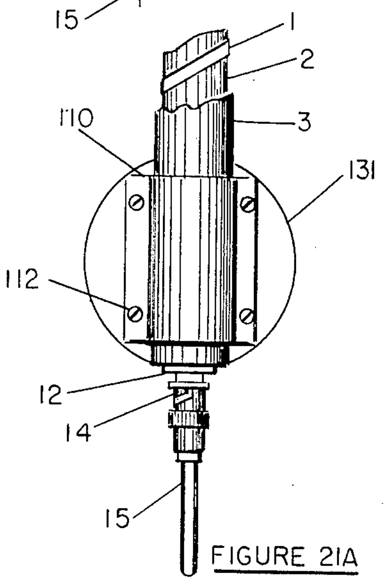
Figures 22, 22A, 23, 23A, 23B, 24, 24A, 24B:
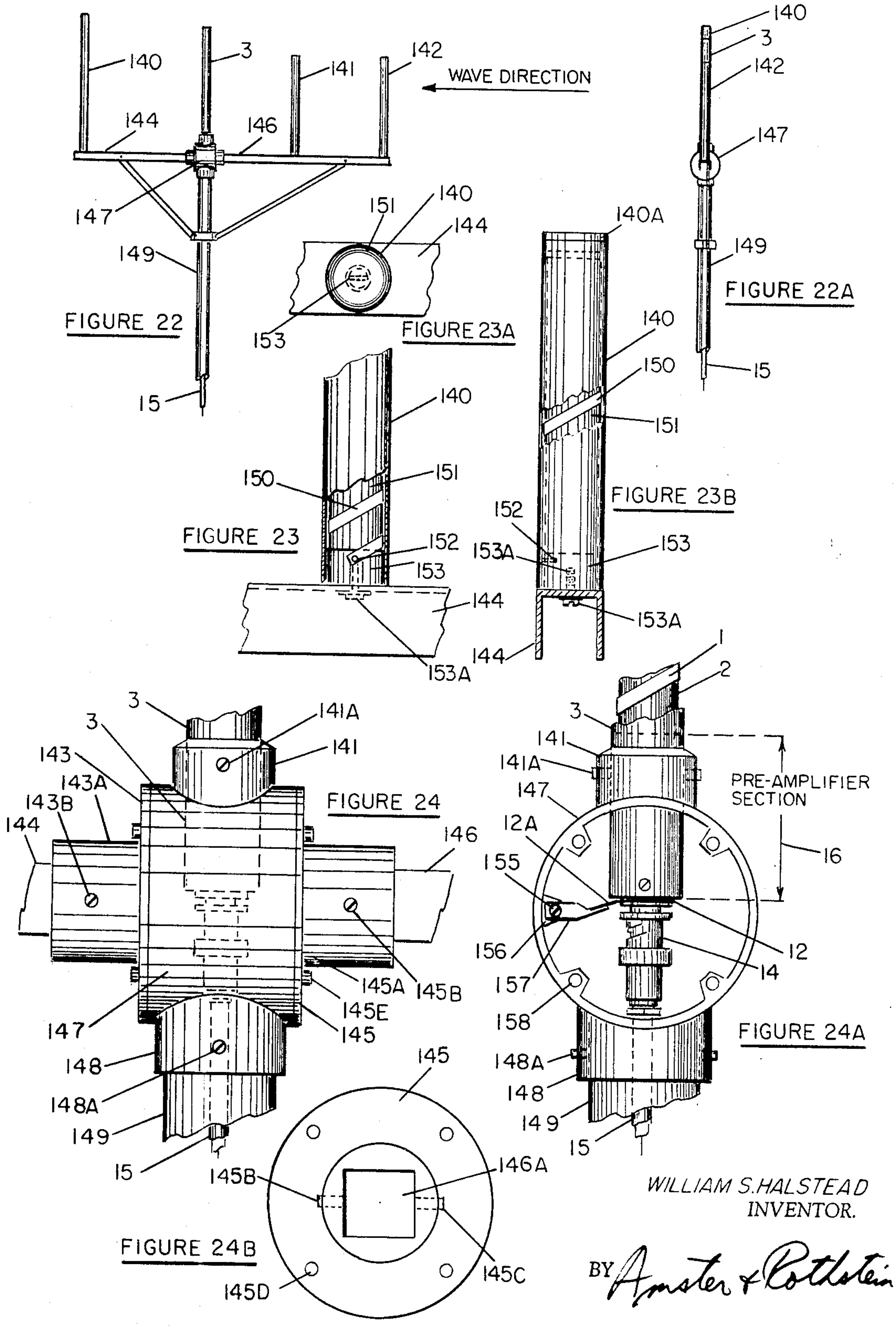

FIG. 1, with the protective casing removed to show the helical configuration of the antenna with the associated preamplifier forming an inherent part of the antenna structure and axially related thereto;

FIG. 2A is a side view of a lower portion of the protective casing of the antenna structure shown in FIG. 1;

FIG. 2B is a bottom view of the antenna structure shown in FIG. 2;

FIG. 3 is a fragmentary cross-sectional view of the antenna supporting structure, showing a cross-section of the preamplifier when the structure is rotated 90° from the position illustrated in FIG. 2;

FIG. 3A is a fragmentary and exploded cross-sectional view of the upper portion of the supporting structure of the antenna shown in FIG. 1, including an end cap at the top of the structure and a portion of the protective casing;

FIG. 4 is a side view of one form of vertical mounting arrangement adapted for support of the antenna structure shown in FIG. 1;

FIG. 4A is a top view of the vertical antenna-mounting arrangement shown in FIG. 4;

FIG. 5 is a chart comparing relative response characteristics of a standard dipole antenna and the helical antenna of the present invention to horizontally polarized electromagnetic energy when both types of antennas are positioned horizontally or vertically;

FIG. 6 is a side view of the antenna structure of FIG. 1 adapted for positioning the antenna in vertical, "angular" elliptical polarization or horizontal positions, and partially broken away to show the internal helical configuration;

FIG. 7 is a front view of the antenna and mounting arrangement of FIG. 6, showing the structure rotated 90° therefrom;

FIG. 8 is a diagram of one form of preamplifier circuit adapted to be incorporated within the antenna structure of FIG. 1 also showing an illustrative form of coupling unit employed in applying D-C voltage to the preamplifier and in connecting the output circuit of the antenna to the input circuit of a receiver;

FIG. 9 is an enlarged front view of the lower portion of a helical antenna structure type similar to that of FIG. 1, showing one side of the preamplifier assembly, including the lower end cap and coaxial connector therefor;

FIG. 9A is a fragmentary front view of the lower portion of the preamplifier assembly shown in FIG. 9;

FIG. 9B is a cross-sectional view of the lower end cap and coaxial connector assembly shown in FIG. 9;

FIG. 10 is a side view of the antenna structure and preamplifier assembly with the end cap and coaxial connector shown in FIG. 9 and rotated 90° therefrom;

FIG. 10A is a bottom view of the structure shown in FIG. 10;

FIG. 11 is a rear view showing the opposite side of the preamplifier section illustrated in FIG. 9, showing the application of printed circuitry to the preamplifier;

FIG. 11A is a fragmentary view of one preferred form of construction of the tubular supporting member of the helical antenna, showing a cross-section of a portion of the lower part of the tubular member and a short length of conductor for connecting the antenna and the preamplifier;

FIG. 11B illustrates the end cap and coaxial connector shown in FIG. 9, with the preamplifier assembly removed for clarity;

FIG. 12 illustrates one form of mounting arrangement for supporting the antenna as shown in FIGS. 6 and 7 within a vehicle in a preferred elliptical polarization position or, as shown in phantom, by means of the mounting arrangement shown in FIG. 4, on the exterior of a vehicle in vertical position;

FIG. 13 is the response characteristic of a helical antenna, made in accordance with the invention, to horizontally polarized electromagnetic energy when the axis of the antenna is inclined at 45° with respect to a horizontal plane (elliptical-polarization position) and rotated through 360°;

FIG. 14 is a simplified representation of a conventional form of transmitting antenna system to provide horizontal polarization of electromagnetic energy and effective radiated power, as commonly employed by frequency modulation (FM) and television broadcast stations;

FIG. 15 is a front view of the antenna structure of FIG. 1 as adapted for mounting on a base assembly, incorporating a D-C power source for the transistor amplifier, partly broken away to show the internal helical configuration;

FIG. 15A is a top view of the antenna and mounting structure shown in FIG. 15;

FIG. 16 is a side view of the antenna and mounting structure illustrated in FIG. 15;

FIG. 17 is a typical circuit diagram of a broadband preamplifier incorporated within the antenna structure shown in FIG. 15, to provide relatively uniform gain within a given frequency range, and also showing an illustrative arrangement of a power supply unit to provide D-C voltage to the transistor amplifier;

FIG. 18 is a side view of the antenna structure of FIG. 1 as adapted for use with a unidirectional receiving antenna system to provide maximum response to horizontally and vertically polarized electromagnetic energy;

FIG. 18A is a top view of the unidirectional antenna shown in FIG. 18;

FIG. 18B is a front view of the unidirectional antenna illustrated in FIG. 18;

FIG. 19 is a detailed front view of the mounting assembly employed in supporting the helical antenna of FIG. 1 vertically on the unidirectional antenna structure shown in FIGS. 18, 18A and 18B;

FIG. 19A is a top view of the mounting assembly shown in FIG. 19;

FIG. 20 is a side view of another form of unidirectional antenna incorporating the antenna structure of FIG. 1 in an arrangement to provide response to all polarization modes of transmitted signals;

FIG. 20A is a front view of the unidirectional antenna arrangement shown in FIG. 20;

FIG. 21 is an enlarged side view of the antenna mounting assembly shown in the unidirectional antenna arrangement of FIG. 20;

FIG. 21A is a front view of the antenna mounting assembly illustrated in FIG. 21;

FIG. 22 is a side view of a unidirectional antenna incorporating the antenna structure of FIG. 1, in combination with reflector and director elements;

FIG. 22A is a front view of the unidirectional antenna structure of FIG. 22;

FIG. 23 is a fragmentary and partly broken away side view of the arrangement employed in mounting reflector and director elements of the unidirectional antenna shown in FIG. 22 in a vertical position on the antenna structure;

FIG. 23A is a fragmentary top view of the mounting arrangement shown in FIG. 23;

FIG. 23B is a partly broken away front view of the antenna and mounting arrangement shown in FIG. 23;

FIG. 24 is an enlarged side view of the mounting arrangement employed in the unidirectional antenna shown in FIG. 22, to support the helical antenna and preamplifier as well as the horizontal supporting member carrying the directional antenna elements;

FIG. 24A is a front view of the antenna mounting arrangement shown in FIG. 24, with the front cover plate removed; and FIG. 24B is a front view of the removable front cover plate normally attached to the antenna mounting assembly shown in FIGS. 24 and 24A.

Referring to FIGS. 1 and 2, illustrating one presently-preferred embodiment of the invention, a ribbon conductor 1, typically fabricated of copper or aluminum, is wound or otherwise formed (e.g., by electroplating) in a unifilar helical configuration on a cylindrical supporting tube or rod 2, of relatively small diameter D as compared with its length L. In one presently preferred form of the antenna, the axial length L of the helical antenna may be approximately 18", equivalent to 67% of the length of a quarter-wave linear antenna at a frequency of 98.7 megacycles (mc.), with a standard correction for the velocity factor of the conductor. The diameter D of the helical winding, as employed in this preferred form of the antenna for optimum response at a frequency of 98.7 mc., can be 1", giving a length-to-diameter (L/D) ratio of 18:1. The helix itself can illustratively comprise 14 turns, uniformly spaced.

The helical antenna structure as described is preferably enclosed in a protective tubular casing 3, fabricated typically of polyvinyl chloride plastic or other suitable dielectric material. The upper end of the protective casing 3 incorporates a cap 4 (FIGS. 1 and 3A), preferably of dielectric material, at the center of which there may be positioned, if desired, a securing screw 5, which may be inserted in a hole 4A (FIG. 3A) to thereby permit engagement in threaded hole 6 positioned in the center of insert plug 7. The plug 7 may be fastened within the helix supporting tube 2 by means of a pin or screw 8. (If desired, the cap 4 may be cemented or pressure-fitted within tube 3, thus eliminating the need for screw 5 and insert plug 7.)

The lower end of the antenna structure may be secured to a hollow cylindrical base member 9 (FIGS. 2, 2B and 3) by means of screws or pins such as 10 in FIG. 1 inserted in holes such as 10A (FIGS. 2 and 3) in the lower portion of base member 9. A coaxial connector 12, which may be of any well-known and suitable type, is mounted in a hole 13 located at the bottom of base member 9. A coaxial plug connector 14 and coaxial cable 15 provide means for connecting the electrical circuitry of the antenna with a cooperating receiver, not illustrated.

In order to provide a high order of gain at the coaxial output connector 12 of the antenna structure, and to eliminate the possibility of impedance mismatch between the antenna and the first radio-frequency amplifier stage where out-of-phase signals in conventional antenna systems often cause crosstalk between main channel and subchannel signals in FM multiplex reception, for example, a preamplifier 16, mounted as shown in FIGS. 2 and 3, is located at the lower end of the helical winding. The preamplifier is in coaxial relationship with the connector so as to minimize the distance between the lower termination of the helical winding 1 and the input of the preamplifier 16. This arrangement also minimizes the possibility of feedback because of undesired coupling the helical antenna winding 1 and the output circuit of the preamplifier 16, as will be described in greater detail below.

The amplifier may be of any well-known type, and it is shown physically in FIGS. 2 and 3, and schematically in FIG. 8. The illustrative amplifier embodiment shown in FIGS. 2 and 3 includes a variable capacitor 17 for tuning the antenna for peak response, a field-effect or other suitable transistor 18, an output-tuning capacitor 19, output-tuning inductance 20, radio frequency (RF) chokes 21 and 22, a various associated components, such as resistors and capacitors, not illustrated physically in FIGS. 2 and 3 (but see FIG. 8).

As is indicated in FIGS. 2 and 3, the amplifier 16 is mounted on a small rectangular circuit board 23, which may illustratively measure about 1" in width and 2" in length and which may be fabricated of any suitable dielectric material normally used with printed circuitry. The upper end of the circuit board 23 is secured within the lower end of antenna-supporting tubing 2, as shown in the cross-sectional view of FIG. 3. In this illustrative arrangement, dielectric spacing elements 24 and 24A may be employed, if desired, to hold the circuit board securely in position at the center of tubing 2, for example by means of pins or screws such as 25 and 25A. Base member 9 is secured to the lower portion of circuit board 23 by means of pins or screws, such as 11B and 11C (FIG. 2) which protrude through the shell of base member 9 into holes 11 (FIG. 3) in circuit board 23. In this manner, the helical antenna-support tubing 2 and transistor amplifier 16 are combined as an electrically and mechanically integrated antenna structure which is adapted to be mounted in any desired form or position, as will be described in further detail in subsequent portions of the specification.

One illustrative form of vertical mounting assembly, is shown in FIG. 4 and includes a cup-like metallic receptacle 30 into which the lower end of circuit board 23 may be inserted and held in vertical position by means of pins (e.g., pins 11B and 11C in FIG. 2) which extend through the mounting receptacle 30 and into holes 11 in the circuit board 23. These pins and holes also are employed in securing base member 9 in position at the lower end of circuit board 23. Receptacle 30 is secured at the end of a metal shaft 31, the lower end of which is threaded to accommodate a nut 32. The thread of shaft 31 extends to the upper part of a threaded mounting flange 33. To support the mounting assembly in a vertical position on a horizontal surface 36 (e.g., of a vehicle), a rubber washer 35 normally is used between flange 33 and the outer body surface 36, with shaft 31 protruding through a hole in the vehicle body. Rubber washers 35A and 35B, which may illustratively be of angularly-cut configuration, may be employed on the lower surface of the body structure to facilitate proper alignment of the antenna in a vertical position. Nut 32 and lock washer 37 hold the supporting shaft 31 securely in position. A coaxial cable 15 is passed through the hollow shaft 31 and hole 34 into mounting cup 30 to permit connection with transistor amplifier 16.

The antenna structure of the present invention will have substantially uniform response characteristics when in any position and will respond equally well to horizontally or vertically polarized electromagnetic energy. A typical comparison of the antenna with a standard half-wave dipole is illustrated by the chart of FIG. 5. This chart is based on comparison at a frequency of 98.5 mc., approximately at the center of the FM broadcast band. The comparison indicates that when horizontally polarized waves are used at a signal source and a prior art dipole is positioned vertically, the response is 23 decibels (db) below a reference level of 0 db that is obtained when the antenna is horizontal and is orientated in a maximum signal position with the dipole elements extending in broadside relationship to the horizontal transmitting antenna. With the helical antenna of the invention, the response to horizontally polarized waves from a vertical position is 1.6 db above the same 0 db reference level previously described. The antenna will also exhibit excellent performance characteristics when mounted in other positions as well, such as the elliptical polarization position (see FIGS. 12 and 13). Thus, the antenna is arranged to have "spherical" response characteristics and is effective in responding to polarization of any mode when mounted in any position, providing suitable applications in various fields such as for mobile services wherein horizontal polarization alone, as well as combined horizontal and vertical polarization of radio waves, may be employed in FM broadcasting, for example. Excellent multiplex reception is also possible with this antenna, even in high signal reflection ("multipath") areas, where extreme crosstalk and distortion conditions in received FM subcarrier signals occur when conventional antennas are employed.

Referring to FIGS. 6 and 7, illustrating one form of adjustable mounting arrangement for the antenna so that it may be positioned vertically, horizontally or at an intermediate angle, the tubular casing 3 of the antenna is inserted in a cylindrical holder 40 and may be secured in the holder by a screw 41 or by press-fit method. The cylindrical holder 40 is welded or otherwise attached to bracket 42 which is mounted on supporting arm 42A; the latter may be provided with a hole into which a screw 43 may be fitted. The screw 43 serves to mount the antenna on U-shaped bracket 44 which is secured to a flat mounting-plate 45 to provide, in a well-known manner, suitable mounting on any surface. (A nut 46 may be used to lock the antenna in a desired position.)

It will be noted that cylinder 40, if made of metal, also serves to enclose the amplifier section of the antenna, providing shielding therefor. However, such shielding may not be important when only a single stage of preamplification is employed and accordingly, in such situations, holder 40 and the entire mounting arrangement, as shown in FIGS. 6 and 7, may be fabricated of lightweight plastic or other suitable non-metallic material.

A representative circuit diagram of one form of transistor amplifier incorporated within the antenna structure is shown in FIG. 8. The open-ended helical winding 1 is connected through a variable tuning capacitor 47 to a source electrode 48 of a field-effect transistor 49, employed in this instance as a linear RF amplifier. In such an arrangement, gate electrode 50 of the transistor is connected to ground. Drain electrode 51 of the transistor is connected to output tuning inductor 52, which may be of the single-turn printed circuit type, as illustrated in FIGS. 8, 9 and 11, or of any other suitable type. A variable tuning capacitor 53 is connected across inductor 52. A low impedance (approximately 72 ohms, for example) output connection 54 is provided at a distance of about one-third of the circumference of the inductor 52 from ground connection 55 thereof. RF connection with ground at terminal 55A is made through capacitor 56. A relatively short output conductor 57 which may be of the printed circuit type as shown in FIGS. 9 and 11, connects with center pin 58 of the coaxial output receptacle 12.

In the circuit arrangement illustrated in FIG. 8A, a positive potential is applied from a D-C voltage source (e.g., line 60A), such as a battery (not illustrated) or any other suitable power supply, through center pin 67 of coaxial connector 68 and center conductor 15A of coaxial cable 15 (FIGS. 1, 4 and 6) connected to output conductor 57. The positive D-C voltage is applied to transistor electrode 51 through RF choke 59 and inductor 52. The negative side 60B of the D-C source is connected (from a common ground) through sheath 15B of the coaxial cable 15 to the ground conductor 55A of the preamplifier as shown in FIG. 8.

Bias for the transistor is furnished by means of resistor 61, shunted with bypass capacitor 62. Bias voltage is applied to electrode 48 of transistor 49 through inductor 63, which in this illustrative circuit arrangement may be an RF inductor that is resonant at a frequency of approximately 100 mc. by means of its distributed capacitance, thereby providing a suitable impedance value at the input to the amplifier.

To conveniently connect the antenna and preamplifier structure to a standard FM receiver in a motor vehicle, for example, and to supply the necessary D-C voltage for operation of the preamplifier, a coupler unit 65 (FIG. 8A) may be employed. Such a coupler unit applies positive potential from line 60A of a vehicle battery through RF choke 66 to center conductor 67 of coaxial receptacle 68, and thence through coaxial cable 15 to the preamplifier. The negative side 60B of the power source is connected to ground. Capacitor 69 is employed across the power source to eliminate electrical noise from the electrical system of the vehicle on which the equipment is used.

Received signal energy from the preamplifier is taken from center conductor 67 of coaxial connector 68, and is passed to center conductor 71 of grounded coaxial output receptacle 72 via capacitor 70. Connection then is made with the RF input of a receiver (not shown) through coaxial cable 73.

One application of the helical antenna and associated transistor amplifier, as described herein is for use in connection with special FM multiplex services transmitted by a selected station in a given geographical area (e.g., localized news and weather reports). Accordingly, the design of the antenna and the preamplifier circuitry provides peak voltage values at a given frequency. The output tuning indicator 52 (FIG. 8) is thus arranged to have a high "Q" characteristic, thereby providing rather sharp tuning at a given frequency within a relatively narrow band. Thus, if the antenna and an associated receiver are employed in an aircraft, for example, maximum protection against adjacent channel interference from other stations within a given geographical area will be provided.

In FIG. 9 is illustrated an enlarged view of the physical arrangement of transistor amplifier 16 and lower portion of the antenna structure. One end of printed circuit board 23 is mounted as indicated by dashed lines 23A, within the cylindrical tubing 2 around which open-ended helical winding 1 of the antenna is formed. Protective casing 3 is illustrated in a partially withdrawn position so as to show the amplifier arrangement. When the protective casing is in position to enclose the preamplifier (e.g., FIG. 1), hole 75 is aligned with hole 76 to permit insertion of a screw or pin 10 (FIG. 1) to hold the case firmly in position.

In the illustrative arrangement of the circuit board 23, shown in FIG. 9, selected components, such as inductor 63, bias resistor 61, bypass capacitor 62, transistor 49 and output capacitor 53, are mounted on the top of the circuit board as shown. Other components, such as output tuning inductor 52, RF choke 59 and capacitor 56, are mounted on the reverse side of the circuit board as shown more clearly in FIGS. 10 and 11, which illustrate the preamplifier from different viewing angles. A comomn ground is provided by printed circuitry conductor strip 77 (FIG. 9A) to which the ground side of all components may readily be connected with minimum wire length. Printed circuitry strip 78, as shown in FIGS. 10 and 11, provides means for connecting helical winding 1 via a short wire 79 to contact point 78A when connection is made with electrode 48 of transistor 49 as shown in the circuit diagram of FIG. 8.

In the lower part of FIG. 11, short wire lengths 80 and 80A, are shown connected (e.g., by soldering) to printed circuitry strips 77 and 81 respectively for attachment to a metal lug or lock washer 82 of coaxial output connector 12; the connector and washer are held in place in a plastic end cap 83, as shown in FIGS. 9 and 10, when the circuit board 23 is in position in the end cap 83. The edges of the board 23 are arranged to fit into slots 84 and 85 (see FIG. 10A) on opposite sides of end cap 83, thus holding the circuit board in a vertical position with respect to the end cap and in a coaxial relationship with regard to the helical antenna structure.

As previously mentioned, the coaxial receptacle 12 is held securely in a center hole 88 (FIG. 9B) of end cap 83 by means of lock washer 82, preferably of the lug-type to facilitate soldering, and by a nut 89 which engages threads on the coaxial receptacle 12.

The lower end of helical winding 1, as shown in FIGS. 10 and 11, is fastened to tubular supporting member 2 by means of a pin or rivet 90 which protrudes through hole 91 (FIG. 10) in the helical ribbon conductor 1 and tubular member 2, which pin may be soldered or otherwise secured firmly in position. Connecting wire 79 is coupled to pin or rivet 90 and to conductor 1, as shown in FIGS. 10 and 11A.

It will be noted that the illustrative arrangement shown in FIGS. 9–11 and in the associated figures, permits the output tuning inductor 52 to be placed so that its axis is perpendicular to the axis of the helical winding of the antenna and thus is in a position of minimum coupling thereto. This results in freedom from RF feedback or regeneration which might otherwise be caused by the proximity of the amplifier output tuning circuit and the helical winding of the antenna.

A helical antenna and preamplifier structure of the type as described herein may readily be adapted for reception of FM multiplex or other VHF signals in an effective manner within several environments, such as the motor vehicle arrangement shown in FIG. 12. In FIG. 12, the solid lines show the antenna structure 3 as mounted, for example, by an arrangement shown in FIGS. 6 and 7, in a preferred elliptical polarization position wherein the angle B is 45°. The illustrated interior mounting is preferred, and FM multiplex program reception is thereby possible without excessive crosstalk, distortion, signal dropouts and ignition noise. This also tends to eliminate conventional antenna problems generally attributed to rapid changes in polarization and signal strength due to reflection from hills, trees and buildings, often causing noise, distortion and rapid dropout of signals, or "flutter." The elliptical polarization position and interior mounting, both of which are difficult or impossible to achieve with conventional antennas, combine to provide results that will markedly improve FM reception in mobile service.

Referring to the typical rear window and body configuration of a passenger car as generally shown in FIG. 12, it is preferable to position the helical antenna in proximity to the metal top of the vehicle, as at 92. This introduces a coupling effect in the region C which will increase received signal strength in weak signal areas as compared with results obtained at such locations when the antenna is placed outside of the car. While the reason for this effect is not definitely known, it is indicated that the body of a passenger car, having top dimensions that approximate one-half wavelength in the FM broadcast band, may itself be acting as a form of VHF antenna of relatively large aperture. As the helical antenna of the present antenna is a configuration that lends itself to use as a coupling device, it appears that RF energy is transferred from the car body structure to the upper portion of the helical winding, thereby increasing received signal strength.

A response chart of the present helical antenna is illustrated in FIG. 13, and shows "circularity" of response pattern within ±0.65 db of the mean value in the reception of horizontally polarized waves. The chart of FIG. 13 illustrates response as the antenna, in an elliptical polarization position, is rotated through 360°. Changes in orientation of the vehicle carrying the antenna thus produce minimum variations in received signal strength as compared with results obtained with conventional FM receiving antennas in mobile service. Although horizontally polarized waves from FM broadcast or other VHF transmitting antennas, such as 93 (FIG. 14), do not retain their original polarization characteristics in the presence of hills, trees and structures in typical urban or rural areas through which vehicles travel, the spherical response characteristic of the present helical antenna obviates this problem, since the antenna responds equally well (within about ±0.75 db) to polarization of any mode or orientation.

The vertical mounting arrangement of the helical antenna on the exterior of a vehicle, as shown by dotted lines 3A in FIG. 12, permits effective use of the helical antenna and preamplifier on vehicles wherein the body structure is of such design that interior mounting is not feasible or desired. In this case, the antenna may be supported in a vertical position by means of a mounting structure such as shown in FIG. 4, wherein mounting flange 29 and supporting sleeve 27 hold the antenna at a distance of several inches above a horizontal surface 36 on the car body. (Vertical positioning of the antenna, when mounted on the exterior of a vehicle, is generally preferred for the reason that it provides maximum response to horizontally polarized waves; uniform omnidirectional characteristics and reduced crosstalk are also obtained.) This may be attributable, in part, to the relatively small horizontal area component of the antenna effectively providing an isotropic or single point response area. This small horizontal area of the helical antenna responds largely to that part of the total electromagnetic field within this horizontal section of the helix, and does not respond to other portions of the field containing reflected and other signals that would produce a substantial increase in out-of-phase voltage if all of these multipath signals were to impinge on the antenna.

When a convention dipole antenna of modified "rabbit-ear" type is employed on a vehicle for FM and TV reception, the linear elements of the dipole extend over a relatively large horizontal area and therefore are cut by substantially more of the total electromagnetic field, including those portions produced by reflected and direct path transmission. This results in serious out-of-phase voltage relationships in the received signals at the terminal of such an antenna. While these out-of-phase signals may be minimized in some cases by rotating the dipole to a vertical position, this produces a very substantial reduction in response to horizontally polarized waves and tends to increase undesirable response to reflected signals which are altered in polarization characteristics due to reflection from hills, trees, buildings and the steel bodies of large vehicles, such as trucks and buses, within the vicinity of the receiving antenna.

The helical antenna of the present inventions is far superior to such prior art antennas in its response to horizontally polarized waves when it is in a vertical position. This may be attributable to the fact that the electromagnetic field cuts more of the conducting surface of the antenna than is the case when the antenna is positioned horizontally. Also, since the axial length of the antenna is a substatial part of one-quarter wavelength at a frequency of 100 mc., and the total length of the winding (if extended linearly) approaches one-half wavelength, it is to be expected that an antenna having these dimensions as related to the wavelength at a given frequency would develop substantial voltage in accordance with conventional antenna theory.

The diagrams of FIGS. 15, 15A and 16 represent an adaptation of the relatively narrow band type of helical antenna and preamplifier previously described for fixed-location use. This modified antenna-preamplifier can be used over a given frequency band, such as that occupied by FM broadcast stations, having a total bandwidth of at least 20 megacycles. The antenna has a tubular cover 3 enclosing helical winding 1. The preamplifier 16 is supported vertically in a metal or plastic receptacle 95 forming a part of a mounting base 96. The axial length of this form of the antenna may, if desired, be approximately the same as for the relatively narrow band antenna previously described, namely about 18″, representing an optimum length for a frequency near the center of the FM broadcast band (i.e., 98.7 mc.). However, to broaden the frequency response of the antenna and preamplifier, the input tuning capacitor 47 (see FIG. 8) has been eliminated and, as shown in FIG. 17, a "swamping" resistor 97 has been inserted across the output tuning capacitor 53 and inductor 52. The modified antenna and preamplifier structure will have maximum response near the center of the FM broadcast band, but will provide effective response over the entire band.

The RF output circuit 57 of the preamplifier is similar to that shown in FIG. 8 except for the addition of capacitor 98 in series with coaxial output receptacle 58. Capacitor 98 prevents D-C voltage, required for the operation of transistor 49, from reaching the RF input of a broadcast receiver (not shown) with which the antenna may be associated.

In order to provide an antenna structure that may be used with any FM broadcast receiver, a small power supply unit 99 (FIG. 17A) is incorporated within mounting base 96, as shown by broken lines in FIGS. 15, 15A and 16. This power supply unit can include any well-known form of D-C power source 100, to provide D-C potential within a given range (e.g., 18–40 volts) over which field effect transistor 49 (FIG. 17) is operable.

An RF choke 101, in series with output conductor 102 (FIG. 17A), is utilized to isolate RF signals from the power supply unit. A capacitor 103 is bridged across the D-C output of the power supply for filtering purposes. A-C voltage from a power main is provided through a standard power plug 104 (FIG. 16), cable conductor 105, switch 106 and fuse 107. A small pilot lamp 108 may be employed to indicate the application of power. The RF output cable 109 of the antenna-preamplifier structure shown in FIG. 16 is connected at one end to the coaxial fitting 58 or other suitable terminal, and at the other end to the RF input of any FM broadcast receiver.

Referring to FIGS. 18, 18A, 18B, 19 and 19A, which show an adaptation of the antenna and integrated preamplifier of the invention for use in a bipolar unidirectional antenna arrangement, the tubular cover 3 (FIG. 18), incorporating helical winding 1, and preamplifier section 16, as shown in FIG. 19, are mounted by means of a U-shaped clamping member 110, screws 112 (FIGS. 19 and 19A) and a metal plate 111 vertically on a horizontal supporting member 113. The horizontal support may be of inverted U or square configuration as viewed in cross section, as shown in FIG. 19.

The supporting bar 113, which can be fabricated of aluminum tubing or other suitable lightweight metal, also holds conventional yagi-type reflector elements 114A and 114B in a horizontal position. (The reflector elements 114A and 114B, preferably fabricated of aluminum, may be hinged at the base of each element by means of pins 115A and 115B, utilizing any well-known mounting construction (e.g., bracket 115) to permit elements 114A and 114B to be folded into position along supporting arm 113 for shipment, with the elements being extended to the reflector position shown in FIG. 18A when the antenna is installed.) The reflectors 114A–114B may be positioned at a distance of about one-quarter wavelength from helical antenna 3 and are approximately 6% longer than one-half wavelength at the design frequency, allowing for correction for the wave velocity factor of aluminum (or whatever material is utilized) in accordance with standard antenna design practice.

Conventional director elements 116A and 116B, having lengths approximately 10% less than one-half wavelength at the design frequency, as is standard practice, are positioned (FIG. 18A) at a distance of about 0.15 wavelength (at the design frequency) on horizontal bar 113 in front of the helical antenna 3. The elements 116A and 116B may be hinged, as is well known, at the support end by pins 117A and 117B on bracket 117 to permit folding of the structure for shipment.

Director elements 118A and 118B (similar to director elements 116A and 116B) may be mounted on horizontal bar 113 at a distance of about 0.15 wavelength in front of the elements 115A and 115B at the design frequency. This illustrative arrangement of horizontal reflectors and directors is similar to that employed in standard yagi-type directional antennas for FM and television reception.

Since the helical antenna 3 has substantially spherical response and therefore responds equally well to transmitted electromagnetic energy of all polarizations, and since many FM broadcast stations, for example, employ transmitting antennas which apply equal power to the horizontal and vertical elements thereof, it is desirable to utilize the total radiated wave energy rather than only that part which is horizontally polarized. Accordingly, in such situations, it may be advantageous to position the helical antenna vertically, with the reflector and director elements positioned horizontally. This will improve the response to the total transmitted energy (e.g., horizontal and vertical components) as compared to conventional antennas (e.g., dipoles).

To further optimize performance of the present antenna in its unidirectional applications, a vertical reflector element 120 (FIGS. 18, 18A and 18B) of the same length as each of reflectors 114A and 114B is mounted on horizontal bar 113, illustratively employing the same type of supporting arrangement as previously described. The reflector 120 also is positioned at a distance of about one-quarter wavelength behind the helical antenna, advantageously as close as possible to reflector elements 114A and 114B. Similarily, vertical director elements 122 and 124, illustratively of the same length as director elements 116A, 116B, 118A and 118B, are positioned on bar 113 spaced generally as shown in FIG. 18 and near respective horizontal director elements.

The entire antenna assembly, as shown in FIGS. 18, 18A, 18B, 19 and 19A may be mounted on a pole 126 employing well-known U clamping means, as shown by the arrangement of end-threaded U-shaped member 127 (FIG. 18A) secured to horizontal bar 113 by means of nuts, such as 128.

The bipolar directional embodiment of the antenna of this invention will provide an increase in total signal voltage at the input of the preamplifier section 16 (FIG. 19) in the helical antenna structure in casing 3, since the helical antenna will respond (due to the vertical elements) with maximum effectiveness to any vertically polarized field, thus taking full advantage of the total effective radiated power from a bipolar transmitting antenna. In the absence of such vertical elements, a substantial portion of the total available field is not utilized to maximum advantage. In weak signal areas, the above-described bipolar antenna embodiment can substantially improve the signal-to-noise ratio and can reduce signal fading effects.

Another unidirectional broadband embodiment of the present antenna is shown in FIGS. 20, 20A, 21 and 21A. A reflecting screen 130 is employed therein to provide a high "front-to-back" signal ratio to minimize the effect of strong reflected waves from the rear as commonly occurs at receiving antenna locations in large metropolitan areas, for example. Under such conditions, conventional linear element reflectors normally employed in unidirectional antennas to receive the usual types of broadcast signals (e.g., FM and television) do not offer sufficient protection from high level reflected electromagnetic energy that may, for example, come from a large building to the rear and within a short distance of the receiving antenna.

In the arrangement as illustrated for vertically supporting the helical-antenna casing 3, a U-shaped clamping member 110 (FIGS. 21 and 21A), similar to that previously described with respect to FIGS. 18 et seq.—is employed in combination with screws 112 to firmly support the tubing 3 of the antenna-preamplifier structure on a circular mounting flange 131. The flange 131 is secured or otherwise locked in position by means of screw 131A and/or by threads (not shown) within the flange 131 which mate with threads on horizontal supporting pipe or tubing 133. The pipe or tubing 133 is held in horizontal position in a T-shaped fitting 134 (FIG. 20) which is positioned at the top of vertical pipe 135.

The reflector 130 preferably comprises a perforated aluminum or other suitable lightweight metal screen 136, having an outer reinforcing ring 130A, fabricated of aluminum or other suitable material, and cross-diagonal braces such as 137 to provide support for the screen. It will be noted that the transmission line or cable 15 is completely enclosed, at the rear of reflector 130, within the metallic supporting structure, including pipe or tubing 133, T fitting 134 and vertical pipe or mast 135. This arrangement is provided to eliminate undesired RF pickup by the transmission line and consequent out-of-phase signals on the exterior thereof, as often occurs in the presence of a high intensity radiation field when receivers are located in the vicinity of large metropolitan-type broadcast stations. These out-of-phase signals may be transferred to the receiver because of the relative nature of an electrical ground point at a given frequency, especially on high buildings.

Although a round screen structure 130 is illustrated, this may be of other configurations, such as a square. Illustratively suitable dimensions across the screen surface (e.g., diameter of screen 130) approximate one-half wavelength plus about 6% at the design center frequency for optimum reflecting action to transmitted waves of horizontal, vertical or elliptical polarization, to which the uniform circular configuration of screen 130 is well suited. In addition, the relatively large screen size as compared with the length of the helical winding 1 in casing 3 will improve the front-to-back ratio at difficult receiving locations where the energy in the reflected wave at the rear may exceed that of waves approaching from the front of the antenna. Such a condition is prevalent on roofs of apartment buildings in most large cities, causing degradation in quality of received FM or television signals, especially if the latter are of color type. The screen 130, whose height is greater than that of helical antenna casing 3, also affords protection against lighting since the screen is at D-C ground potential. The antenna-preamplifier structure within casing 3 is connected to ground by a short length of wire 138 (FIG. 21) extending between lug 139 on coaxial receptacle 12 and metal flange 131. D-C voltage for operation of the amplifier within protective casing 3, as well as received RF signals, are carried by the single coaxial cable 15, as heretofore described.

Referring to FIGS. 22 et seq., a unidirectional antenna embodiment is shown in which reflector 140 and director elements 141 and 142 are of helical configuration and are vertically positioned, thereby maximizing received VHF electromagnetic energy and maintaining proper phase relatonships of signals when transmitted waves are of horizontal and/or vertical polarization.

The preamplifier section 16 in casing 3 (FIG. 24A) is mounted vertically within a metal collar 141 forming a part of a hollow cylindrical fitting or housing 147 preferably fabricated of cast aluminum, bronze or other suitable metal. The antenna casing 3 is held securely in position by set screw 141A. The front of housing 147 has a round cover plate 145 (removed for clarity in FIG. 24A) and an appended collar 145A into which may be secured a forwardly-extending horizontal arm 146 fastened in place by set screw 145B. Similarly, a second horizontal arm 144 is held securely in cover plate 143 and collar 143A by means of set screw 143B. Horizontal arms 144 and 146 preferably are fabricated of aluminum or other suitable lightweight metal and may be of U or square cross-sectional configuration, the former being shown in FIG. 23B.

In FIG. 24B, which illustrates front mounting flange 145 as viewed from the direction of supporting arm 146, the square aperture 146A formed in collar 145A of cover plate 145 is shown. The forwardly-extending arm 146, illustratively square in cross-section, is fitted and secured in position in aperture 146A by set screws 145B and 145C. Mounting holes 145D are provided in plate 145 to accommodate screws such as 145E (FIG. 24) which thread into such holes.

The coaxial output receptacle 12 (FIG. 24A) at the bottom of the helical antenna and preamplifier casing 3 is connected to metal housing 147 by means of a conducting strip 157 which connects with a metal lug 12A on coaxial receptacle 12 and a screw 155 which is threaded into a hole in inward projection 156 of the cylindrical housing 147. A downwardly-extending collar 148 on the lower section of housing 147 is fitted on a vertical pipe or mast 149, which may be secured in position by set screw 148A or by means of threads (not shown) in collar 148 and on the end of pipe 149.

The coaxial cable 15 employed to carry D-C voltage into the preamplifier and RF signals from the preamplifier to a receiver is connected with coaxial receptacle 12 by means of any well-known type of coaxial plug 14, preferably of twist-lock type as shown. When cover plate 145 is in position on housing 147, as shown in FIG. 24B, all portions of the coaxial cable as well as the preamplifier section 16 within casing 3 are completely shielded from adverse weather and electrical conditions. Only helical winding 1, within weatherproof casing 3, is not encased in metal and can be reached by a radiation field. Thus, pickup of electrical noise or development of out-of-phase voltage on the transmission line 15, as often occurs in urban areas with conventional antennas and coaxial or "twin-lead" transmission lines in the vicinity of high power transmitters, will, under the arrangement described herein, be minimized.

Reflector element 140, shown in FIGS. 22A, 23, 23A and 23B is of spherical response type and includes helical winding 150 (FIGS. 23 and 23B) wound on tubing 151 in the same manner as previously described for helical antenna winding 1 on tubing 2 within casing 3. The lower end of winding 150 is attached, by means of screw or pin 153A or any other well-known and suitable method, to a cylindrical metal plug 153, fabricated of aluminum or other suitably conductive material, disposed within tubular member 151 about which helical winding 150 is formed. Plug 153 then is secured firmly in position on metal arm 144 and in electrical contact therewith by means of vertically positioned screw 153A. The helical winding 150 thus is held at the same D-C ground potential as the entire supporting structure of the antenna. The axial length of the helical winding 150 of reflector element 140 may be about 6% greater than that of helical antenna winding 1 (FIG. 24A). Reflector element 140 normally is positioned vertically on arm 144 at a distance of about one-quarter wavelength to the rear of helical antenna 3. As the height of reflector element 140 is greater than that of antenna casing 3 or directors 141 and 142, and since winding 150 is a D–C ground potential, the reflector 140 will also provide lightning protection when mounted on high rooftops or other elevated locations.

Director elements 141 and 142 (FIG. 22) similarly incorporate helical windings similar to winding 150, and may be approximately 10% shorter in axial length than helical antenna winding 1 in FIG. 24A. Fabrication and mounting arrangements of director elements 141 and 142 on horizontal arm 146 are the same as that described in connection with the reflector element 140, with the director elements 141 and 142 being similarly positioned vertically. Spacing between the antenna casing 3 and director element 141 preferably is about 0.15 wavelength, with similar spacing between director elements 141 and 142.

The vertically disposed helical antenna windings 1 (in casing 3) and 150 (in reflector 140) and similar windings in director elements 141 and 142 will respond with a high order of effectiveness and in a substantially similar manner to electromagnetic energy of horizontal, vertical or elliptical polarization. Thus, in receiving signals from an FM broadcast station that transmits both horizontally and vertically polarized waves, for example, with equal or substantially equal distribution of radiated power in each of the two polarization modes, an appreciable increase in received signal voltage will be produced in coaxial output cable 15, leading to a receiver (not shown), since the antenna responds to the total radiated energy.

While the foregoing specification has discussed the construction and advantages of the spherical-response antenna of the present invention primarily in the FM broadcast field, with attention being directed to the important operational problems that have been found to occur in receiving FM multiplex subcarrier signals transmitted by FM broadcast stations to aircraft, as well as surface vehicles, it is to be understood that antennas and preamplifier sturctures of the type described herein also can be utilized to substantial advantage in receiving all types of television signals, and in many radio communication services, such as in the mobile radio bands and amateur 140-megacycle band. The present invention is particularly applicable to such mobile radio usage, due to the inherent problems attributable to intermixture of horizontal and vertical directional antennas at fixed stations, leading to reception difficulties when vehicle antennas, normally of the vertical "whip" type, are used in establishing communication with a fixed station employing a horizontal antenna.

Similarly, although emphasis has been placed on the use of the helical antenna and integrated preamplifier in the VHF band where the relatively small physical size of the structure presents practical advantages, as compared with conventional antennas of larger dimensions, it is understood that the same configuration and dimensional ratios as related to wavelength may be adapted for use at lower or higher frequencies, such as in HF, UHF or SHF bands.

It is to be understood that the above-described arrangements are illustrative of the applications of the principles of the invention. Numerous other embodiments may be devised by those skilled in the art without departing from the spirit and scope of the invention.

What is claimed is:

1. An antenna structure responsive to transmitted signals of varied polarization for furnishing said signals to receiving equipment comprising a unifilar helically-wound conductor having an axial length between one-quarter and one-eighth of the wavelength of said signals and of relatively small diameter as compared to said axial length, an amplifier integrated with said conductor and having input and output terminals positioned at one end of said conductor and extending longitudinally therefrom, said conductor having a first electrically free end and a second end connected to one of said input terminals of said amplifier and means for connecting said output terminals of said amplifier to said receiving equipment for obtaining power therefrom to activate said amplifier and for providing said signals thereto.

2. An antenna in accordance with claim 1 including in addition a tubular casing enclosing said conductor and said amplifier and a base member at one end of said casing adjacent said amplifier, said output terminals of said amplifier being positioned on said base member.

3. An antenna structure in accordance with claim 2 wherein said casing comprises dielectric material.

4. An antenna structure in accordance with claim 2 further including a dielectric core axially disposed within said helically-wound conductor.

5. An antenna in accordance with claim 2 wherein said conductor includes a plurality of substantially equally spaced turns and said diameter is substantially uniform.

6. An antenna in accordance with claim 5 wherein said conductor comprises a metallic ribbon and the spacing between each of said turns is greater than the width of said ribbon.

7. A unidirectional antenna structure having spherical-response characteristics to transmitted signals of any polarization comprising a helical winding having an axial length of at least one-eighth of the wavelength of said signals and having a small diameter as compared with said axial length, a preamplifier having input and output terminals disposed in immediate proximity to and forming an extension of said helical winding whereby one end of said helical winding and one of said input terminals of said preamplifier are connected with each other, means coupling said output terminals of said preamplifier to ground and to a signal output terminal, unidirectional reflector means disposed proximate to said helical winding and spaced laterally therefrom for increasing the amplitude of said signals as detected by said winding, first circuit means electrically connecting said reflector means to said ground and second circuit means including said coupling means for furnishing power to said output terminals of said preamplifier.

8. A unidirectional antenna structure in accordance with claim 7 wherein said helical winding is disposed substantially vertically and wherein said reflector means includes a first reflector element disposed horizontally and a second reflector element disposed vertically, whereby said unidirectional antenna structure provides substantially equal and directional response to said transmitted signals.

9. A unidirectional antenna structure in accordance with claim 8 including in addition at least one director element arranged in yagi antenna configuration with said helical winding and said reflector elements, and conducting means for supporting said reflector and director elements, and wherein said first circuit means includes means for connecting said conducting means to said ground.

10. An antenna structure for maintaining proper phase relationships in the transfer of electromagnetic signals to receiving equipment comprising a helical winding having an axial length between one-quarter and one-eighth of the wavelength of said signals and of relatively small diameter as compared with said axial length and having at least one free end, a preamplifier integrated with said winding in said antenna and having an input circuit electrically connected to the other end of said winding, said input circuit having an impedance valve substantially equal to that of said winding, and an output circuit having an impedance value substantially equal to that of said receiving equipment coupled thereto and means for supplying power to said output circuit to activate said preamplifier independent of the reception of said signals.

11. An antenna structure in accordance with claim 10 wherein said receiving equipment includes a coaxial transmission line and including in addition a coaxial connector for coupling said output circuit to said transmission line.

12. An antenna structure in accordance with claim 10 including a tubular dielectric casing surrounding said winding and said preamplifier and a protective end cap on said casing.

13. An antenna structure responsive to transmitted signals of varied polarization for furnishing said signals to receiving equipment comprising a helically wound conducting ribbon having an axial length of at least one-eighth of the wavelength of said signals and of relatively small diameter as compared to said axial length and having an electrically free end, a preamplifier supported at one end of said helical winding and forming an axial extension thereof, said preamplifier having input and output terminals, a dielectric casing enclosing said winding and said preamplifier, a mounting base assembly to support said preamplifier and said casing in a substantially vertical position, a power supply unit having an input and an output circuit and contained within said mounting base assembly, first circuit means for providing voltage of a first polarity from said power supply output circuit to said output terminals of said preamplifier and for providing voltage of a second polarity from said power supply output circuit to one of said input terminals of said preamplifier independent of said signals and second circuit means for applying power to said input circuit of said power supply unit and transmission line means coupling said output terminals of said preamplifier and said receiving equipment.

14. A unidirectional antenna structure responsive to signals transmitted in any of a plurality of polarization modes comprising a helical winding having an axial length of at least one-eighth of the wavelength of said signals and having a small diameter as compared to said axial length, said winding further having at least one electrically free end, a preamplifier mechanically integrated as an axial extension to said helical winding and having an input terminal connected to another end of said helical widing, a ground terminal and an output terminal, a tubular dielectric casing enclosing said helical winding and said preamplifier, mounting means for supporting said casing and said preamplifier, a reflecting screen carried on said mounting means and having a width of approximately one-half of the wavelength of said signals, a coaxial cable coupling said output and ground terminals of said preamplifier to said receiving equipment, said cable being carried by said mounting means to shield said coaxial cable from additional ones of said signals from the side of said reflecting screen away from said casing and preamplifier and circuit means for connecting said ground terminal to said mounting means.

15. A unidirectional antenna in accordance with claim 14 wherein said mounting means includes a first collar extending substantially normal to the axis of said casing, a hollow conductive arm carried within said collar for receiving said coaxial cable therein, a support housing for holding said arm in a substantially horizontal position, a supporting and substantially vertical conductive mast for receiving said cable therein and a second collar for mounting said support housing on said mast, and wherein said reflecting screen is mounted on said arm approximately one-quarter of the wavelength of said signals from said casing and said preamplifier.

16. A unidirectional antenna for responsive to transmitted signals of varied polarifations and for furnishing said signals to receiving equipment comprising a first helical winding having an axial length between one-eighth and one-quarter of the wavelength of said signals and a smaller diameter compared to said length and having one free end, an amplifier having input terminals connected to another end of said winding and output termials coupled to said receiving equipment, a reflector element having a second helical winding of an axial length greater than said axial length of said first helical winding, means for supporting said reflector element spaced from said first helical winding whereby reflected and incident ones of said signals are in phase, said supporting means being electrically conductive and including means connected to said reflector element, a coaxial cable having a center conductor connected to said first helical winding and a conducting sheath connected to said supporting means for furnishing said signals to said receiving equipment and circuit means for furnishing power to said preamplifier over said coaxial cable independent of said signals.

17. A unidirectional antenna in accordance with claim 16 and including in addition at least one director element having a third helical winding and mounted on said supporting means on the side opposite that of said reflector element with relation to said first helical winding.

18. A unidirectional antenna in accordance with claim 17 wherein said reflector element is spaced approximately one-quarter of the wavelength of said signals from said first helical winding and said at least one director element is spaced between approximately 0.1 and 0.2 of the wavelength of said signals from said first helical winding.

References Cited

UNITED STATES PATENTS

| | | | |
|---|---|---|---|
| 2,712,604 | 7/1955 | Thomas | 343—872 XR |
| 3,246,245 | 4/1966 | Turner | 343—895 XR |
| 3,296,536 | 1/1967 | Copeland | 343—701 XR |
| 3,383,695 | 5/1968 | Jarek | 343—895 |
| 3,396,396 | 8/1968 | Charlton | 343—872 XR |
| 3,386,033 | 5/1968 | Copeland | 325—373 |

OTHER REFERENCES

Copeland et al., Antennas Have Built-In Circuits, Electronic Industries, May 1963, pp. 115–120.

ROBERT L. GRIFFIN, Primary Examiner

K. W. WEINSTEIN, Assistant Examiner

U.S. Cl. X.R.

325—374; 343—701, 838, 872, 895